(12) United States Patent
Nakada et al.

(10) Patent No.: US 8,068,052 B2
(45) Date of Patent: Nov. 29, 2011

(54) RADAR APPARATUS AND METHOD FOR FORMING RECEPTION BEAM OF THE SAME

(75) Inventors: Taihei Nakada, Kawasaki (JP);
Junichiro Suzuki, Kawasaki (JP);
Yoshiaki Satake, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 12/471,027

(22) Filed: May 22, 2009

(65) Prior Publication Data
US 2010/0090897 A1 Apr. 15, 2010

(30) Foreign Application Priority Data

Jul. 2, 2008 (JP) .................. 2008-173865

(51) Int. Cl.
*G01S 13/00* (2006.01)
*G01S 13/74* (2006.01)
*G01S 13/08* (2006.01)
*H01Q 1/28* (2006.01)

(52) U.S. Cl. ............. 342/29; 342/42; 342/47; 342/89; 343/705; 343/708

(58) Field of Classification Search ......... 342/29–51, 342/89; 343/705, 708, 711–717
See application file for complete search history.

(56) References Cited

U.S. PATENT DOCUMENTS

| | | | | |
|---|---|---|---|---|
| 3,474,446 A * | 10/1969 | Shestag et al. | ............. | 342/372 |
| 3,531,803 A * | 9/1970 | Hudspeth et al. | ............. | 342/356 |
| 3,699,574 A * | 10/1972 | O'Hara et al. | ............. | 342/154 |
| 3,839,720 A * | 10/1974 | Reindel | ............. | 342/373 |
| 4,612,543 A * | 9/1986 | DeVries | ............. | 342/187 |
| 4,885,589 A * | 12/1989 | Edward et al. | ............. | 342/175 |
| 4,899,162 A * | 2/1990 | Bayetto et al. | ............. | 343/700 MS |
| 4,980,692 A * | 12/1990 | Rudish et al. | ............. | 343/700 MS |
| 5,151,706 A * | 9/1992 | Roederer et al. | ............. | 342/372 |
| 5,173,706 A * | 12/1992 | Urkowitz | ............. | 342/99 |
| 5,220,330 A * | 6/1993 | Salvail et al. | ............. | 342/62 |
| 5,256,988 A * | 10/1993 | Izadian | ............. | 330/295 |
| 5,339,086 A * | 8/1994 | DeLuca et al. | ............. | 342/371 |
| 5,561,434 A * | 10/1996 | Yamazaki | ............. | 343/700 MS |
| 5,565,879 A * | 10/1996 | Lamensdorf | ............. | 343/781 R |
| 5,641,135 A * | 6/1997 | Stuart et al. | ............. | 244/172.6 |
| 5,767,806 A * | 6/1998 | Watanabe et al. | ............. | 342/373 |
| 5,995,062 A * | 11/1999 | Denney et al. | ............. | 343/853 |
| 6,043,776 A * | 3/2000 | Chiba et al. | ............. | 342/354 |
| 6,166,677 A * | 12/2000 | Kikuchi et al. | ............. | 342/25 D |

(Continued)

FOREIGN PATENT DOCUMENTS

EP 0 380 914 A2 8/1990

(Continued)

*Primary Examiner* — Thomas Tarcza
*Assistant Examiner* — Peter Bythrow
(74) *Attorney, Agent, or Firm* — Oblon, Spivak, McClelland, Maier & Neustadt, L.L.P.

(57) ABSTRACT

When an excitation signal is generated from an exciter due to an activation signal generated from a radar control device and is distributed to supply to each antenna sub-module, a combination reception signal is transmitted to a receiver from each antenna sub-module. The receiver takes in the combination reception signal obtained by each sub-module in response to an instruction from the radar control device, a frequency converter converts the combination reception signal into a prescribed frequency band, and a distributed aperture combination circuit performs a beam combination in accordance with a distributed aperture combination algorithm. In this way, a radar apparatus, which is equivalent to an active phased array radar of a large aperture and with high performance, is achieved.

6 Claims, 5 Drawing Sheets

U.S. PATENT DOCUMENTS

| | | | |
|---|---|---|---|
| 6,268,828 B1 * | 7/2001 | Martek | 342/373 |
| 6,407,711 B1 * | 6/2002 | Bonebright et al. | 343/705 |
| 6,768,456 B1 * | 7/2004 | Lalezari et al. | 342/373 |
| 6,771,218 B1 * | 8/2004 | Lalezari et al. | 342/373 |
| 6,774,848 B2 * | 8/2004 | Wright | 343/700 MS |
| 6,784,838 B2 * | 8/2004 | Howell | 342/377 |
| 6,842,157 B2 * | 1/2005 | Phelan et al. | 343/893 |
| 6,879,291 B2 * | 4/2005 | Duxbury et al. | 343/700 MS |
| 7,248,210 B2 * | 7/2007 | Bruce et al. | 342/175 |
| 7,414,567 B2 * | 8/2008 | Zhang et al. | 342/29 |
| 7,522,095 B1 * | 4/2009 | Wasiewicz et al. | 342/160 |
| 2003/0006134 A1 * | 1/2003 | H. et al. | 204/242 |
| 2003/0052828 A1 * | 3/2003 | Scherzer et al. | 343/700 MS |
| 2003/0076274 A1 * | 4/2003 | Phelan et al. | 343/895 |
| 2004/0174303 A1 * | 9/2004 | Duxbury et al. | 343/700 MS |
| 2004/0196834 A1 * | 10/2004 | Ofek et al. | 370/352 |
| 2005/0083245 A1 * | 4/2005 | Yukl | 343/909 |
| 2007/0257858 A1 * | 11/2007 | Liu | 343/893 |
| 2008/0150794 A1 * | 6/2008 | Suzuki | 342/190 |
| 2009/0009391 A1 * | 1/2009 | Fox et al. | 342/372 |

FOREIGN PATENT DOCUMENTS

| | | |
|---|---|---|
| JP | 2002-277533 | 9/2002 |
| JP | 2007-3325 | 1/2007 |
| WO | WO 03/015212 A1 | 2/2003 |
| WO | WO 2006/130993 A1 | 12/2006 |
| WO | WO 2006130993 A1 * | 12/2006 |

* cited by examiner

RADAR APPARATUS AND METHOD FOR FORMING RECEPTION BEAM OF THE SAME

CROSS-REFERENCE TO RELATED APPLICATIONS

This application is based upon and claims the benefit of priority from prior Japanese Patent Application No. 2008-173865, filed Jul. 2, 2008, the entire contents of which are incorporated herein by reference.

BACKGROUND OF THE INVENTION

1. Field of the Invention

The present invention relates to a radar apparatus using an active-type antenna device which is mounted on a mobile object such as an airplane and is formed by using an airplane shape to a maximum extent, and relates to a method for forming a reception beam of the radar apparatus.

2. Description of the Related Art

In recent years, in an antenna device of a radar mounted on an airplane, with the enhancement of requirements for higher performance of the radar, requirements for active phased arraying having high function and high performance have become increased. However, in comparison with a conventional passive antenna, the active phased arraying of the antenna device necessitates an increase in device size such as dimensions and mass as a circuit configuration has become complicated.

Meanwhile, to enhance the performance of the radar, it is needed to enlarge an antenna aperture area. However, there is a limit for use in airplane to enlarge an aperture of a relatively large-sized active phased array antenna.

In such a situation, for improving the performance of the radar apparatus for mounting until now, for example, a method for adopting a passive-type antenna of a large aperture and a method for protruding a radome toward the lower part of an airplane body to accommodate the antenna in the radome have been introduced.

However, since the passive-type antenna of the large aperture may not perform high-rate beam scanning, the performance in a scanning rate has no advantage over the active-type antenna. Meanwhile, the method for protruding the radome toward the lower part of the airplane body to accommodate the antenna in the radome poses a limit for enlarging the aperture of the antenna due to restriction on mounting, and it is necessary to repair the airplane body on a large scale, so that the problem of expenses is produced.

In the active-type antenna, as regards the radar apparatus using an adaptive array antenna is concretely disclosed, for example, in Jpn. Pat. Appln. KOKAI Publication No. 2007-003325.

As mentioned above, in the conventional radar apparatus, in a case in which there is a limitation in an installation place because the radar apparatus is mounted on a mobile object, since it is hard to enhance the performance and enlarge the aperture of the antenna device, it is also hard to actualize the improvement of the performance of the radar.

BRIEF SUMMARY OF THE INVENTION

The radar apparatus of the invention comprises a plurality of antenna sub-modules which are each installed at arbitrary positions, and each function as individual active phased array antennas, a control means for forming a reception beam by exciting the plurality of array antenna modules and by individually and selectively applying directional control, and a reception processing, means for obtaining a beam combination signal by taking in a reception signal obtained by each of the plurality of antenna sub-modules to apply distributed aperture combination processing to the reception signal.

The method for forming a reception beam of the radar apparatus comprises dividing an active phased array antenna into a plurality of antenna sub-modules to install each divided module at an arbitrary position, forming a reception beam by exciting the plurality of antenna sub-modules to individually and selectively applying direction control, and combining a beam combination signal by taking in a reception signal each obtained by the plurality of antenna sub-modules to apply distributed aperture combination processing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The following will describe embodiments of the invention in detail with reference to the drawings.

Figure 1:
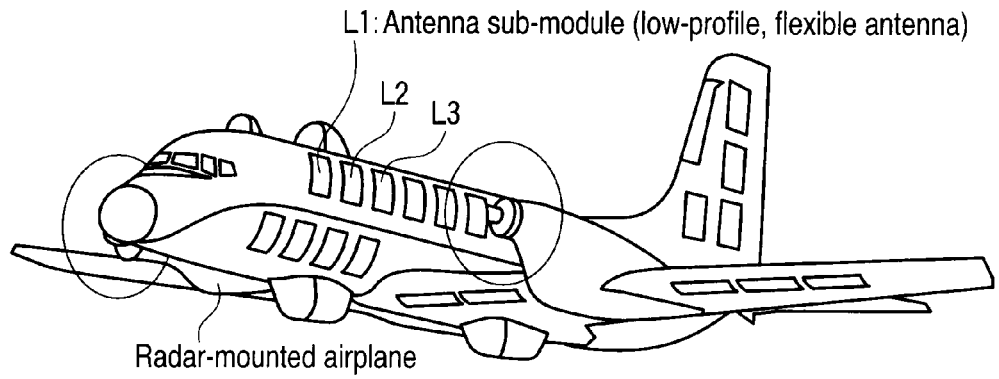
FIG. 1 is an exemplary perspective view depicting an antenna mounting image of an airplane on which a radar apparatus of the invention is mounted.

FIG. 1 shows a perspective view illustrating an antenna mounting image of an airplane A on which a radar apparatus of the invention is mounted. In FIG. 1, the airplane body surface of the airplane A is provided with each low-profile and flexible transmission/reception array antenna, which individually functions an active phased array antenna. A plurality of antenna sub-modules L1-Ln, which function as an active phased array antenna in all, are mounted on arbitrary positions.

Figure 2:
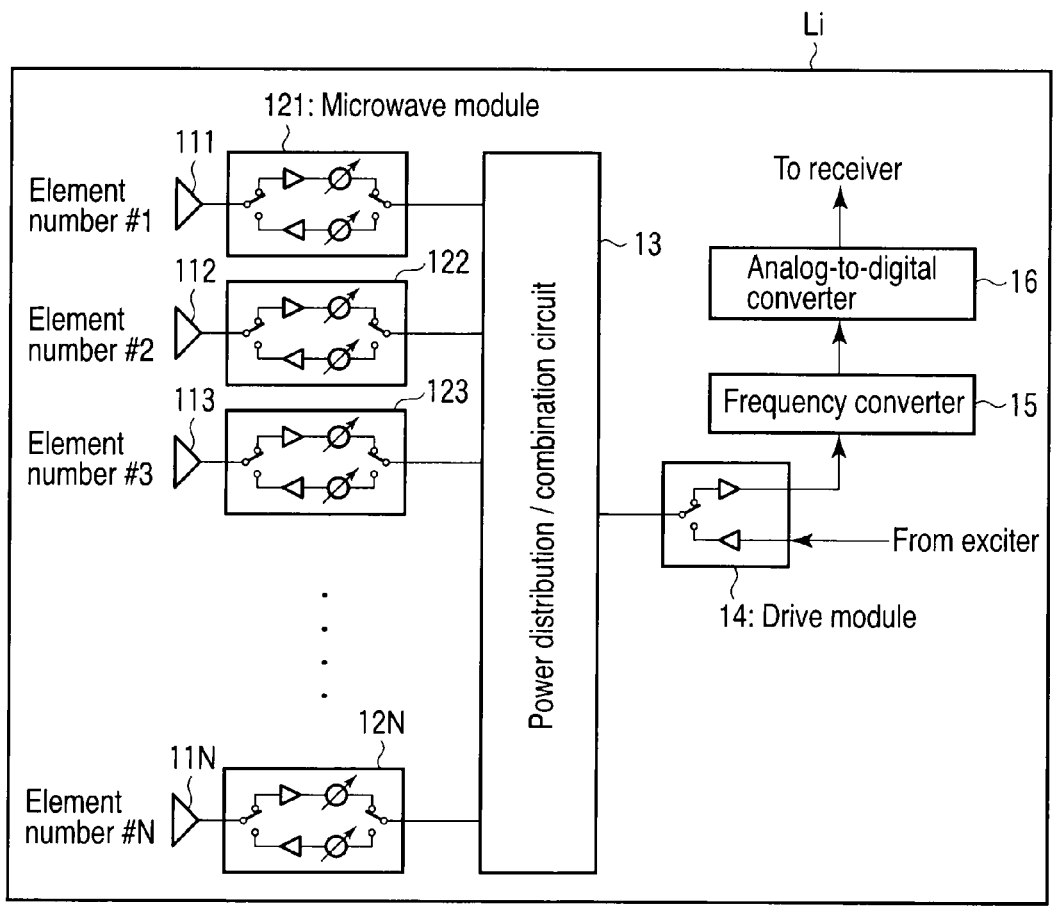
FIG. 2 is an exemplary block diagram depicting a configuration of a transmission/reception sub-module for use in the radar apparatus.

These antenna sub-modules Li (i are 1 to n) each include, as shown in FIG. 2, N antenna elements (element numbers #1-#N) 111-11N; microwave modules 121-12N which selectively switch excitation and reception of each element 111-11N and compensate each phase and amplitude of transmission signals and reception signals; a power distribution/combination circuit 13 which power-distributes excitation signals to each microwave modules 121-12N and combines reception outputs from each module 121-12N; a drive module 14 which selectively outputs from the power distribution/combination circuit 13; a frequency converter 15 which frequency-converts the combined reception signal output from the drive module 14 into a digital frequency band; and an analog-to-digital converter 16 which converts the frequency-converted combined reception signal into a digital signal.

Figure 3:
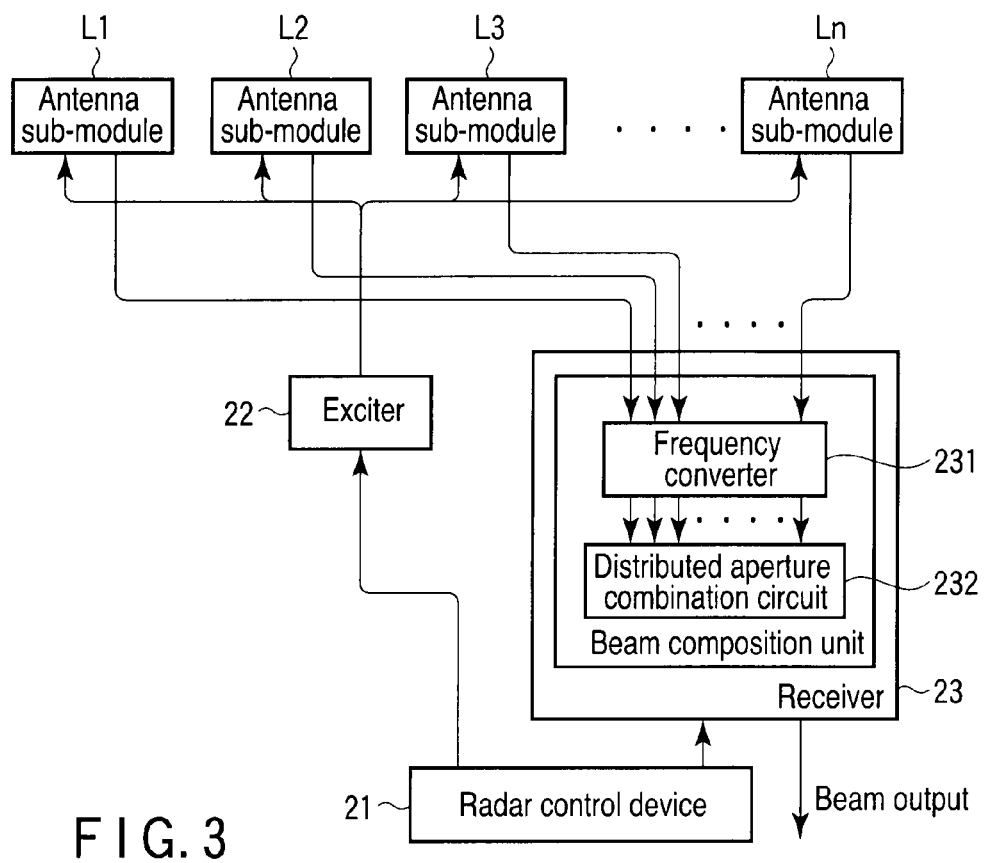
FIG. 3 is an exemplary block diagram depicting a configuration of a radar apparatus of an embodiment using the transmission/reception sub-modules.

FIG. 3 shows a block diagram illustrating a configuration of the radar apparatus of the embodiment using the antenna sub-modules L1-Ln. In FIG. 3, when an activation signal is firstly generated from a radar control device 21, an exciter 22 generates the excitation signals. The excitation signals are distributed and supplied to each reception sub-modules L1-Ln. Meanwhile, the combined reception signals L1-Ln obtained at each sub-module L1-Ln are transmitted to a receiver 23. The receiver 23 tales in the combined reception signals obtained from each sub-module L1-Ln in response to an instruction, converts the combined reception signal into s prescribed frequency band by means of a frequency converter 231, and performs beam combination in accordance with a distribution aperture combination algorism by means of a distribution aperture combination circuit 232. The beam output obtained here is transmitted as an output from the receiver 23 to a signal processor (not shown).

Figure 4:
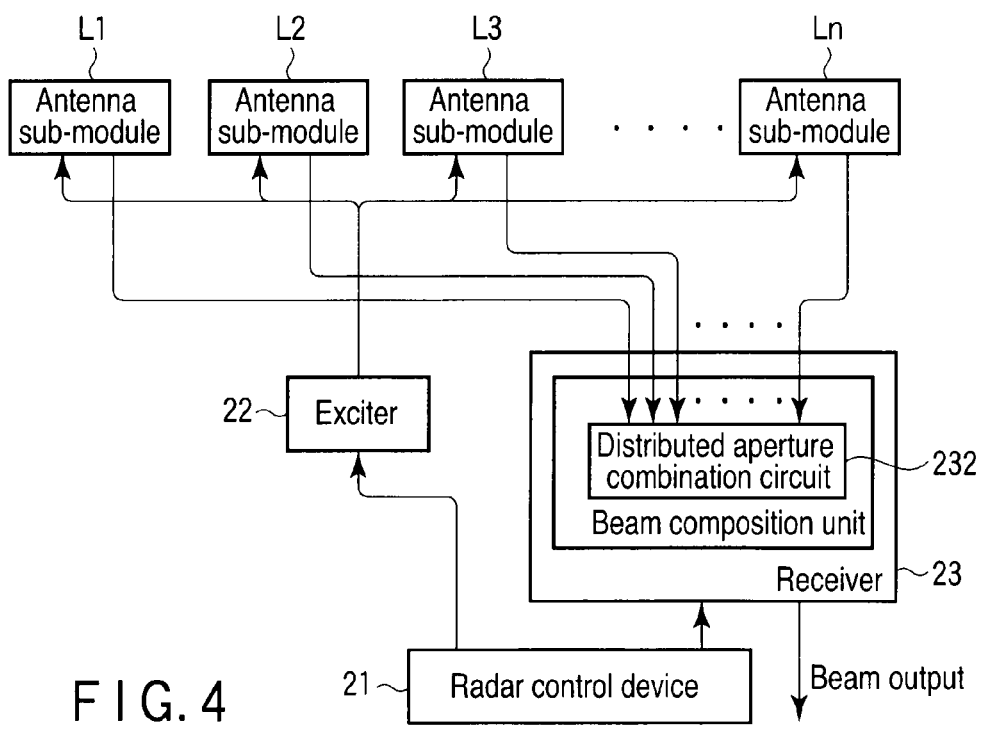
FIG. 4 is an exemplary block diagram depicting a configuration of a radar apparatus of another embodiment using the transmission/reception sub-modules.
Figure 5:
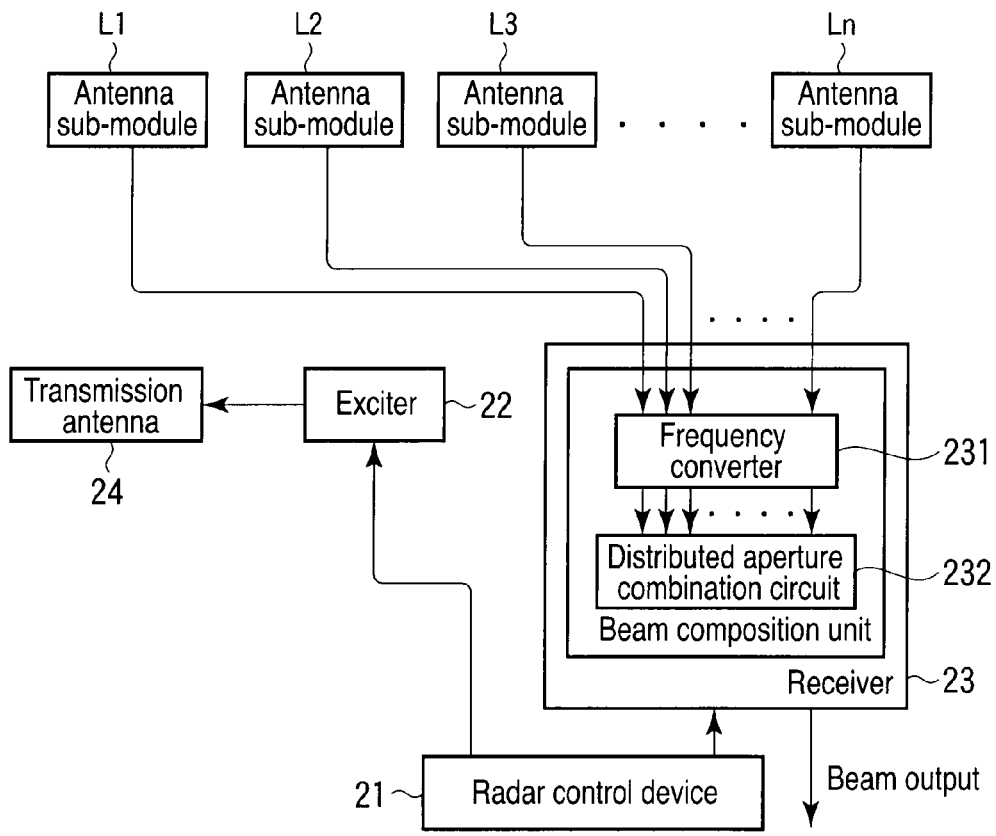
FIG. 5 is an exemplary block diagram depicting further embodiment using the transmission/reception sub-modules and a transmission antenna.

While the example in FIG. 3 has been described so as to include the frequency converter 231 inside the receiver 23, since the antenna sub-modules L1-Ln also include the frequency converter 15, as shown in FIG. 2, the radar apparatus may omit the frequency converter 231 of the receiver 23 and process the combined reception signals through the frequency converters 15 on the antenna sub-module L1-Ln sides as shown in FIG. 4. As shown in FIG. 5, in a case in which a transmission antenna 24 is proved for an airplane head part, etc., a transmission system of the antenna sub-modules L1-Ln may be omitted and the excitation output from the exciter 22 may be output to the transmission antenna 24.

In the radar apparatus with the combination mentioned above, processing content of the distributed aperture combination circuit 232, obtaining the distributed aperture combined beam output by using the selected reception output from each antenna sub-module L1-Ln, will be described.

Firstly, when a direction matrix in an incoming direction of a reception signal X is defined as "A", a complex amplitude vector is defined as "S", an average is defined as "0", and a heat noise obtained by a distribution $\sigma^2$ is defined as "n", a reception signal X is expressed by the following Equation 1.

$$X = A \cdot S + n$$

Further, when target signals are received by "N" element antennas #n (n are 1 to N) arranged in an array shape at dx intervals, a steering vector a ($\theta_d$) deciding a wavelength $\lambda(\Lambda)$ of a reception frequency signal and an incoming direction of "D" incoming target signal d (d are 1 to D) is expressed by the following Equation 2.

$$a(\theta_d) = \begin{bmatrix} \exp\left(j\frac{2\pi}{\lambda} dx \cdot 0 \cdot \sin\theta_d\right) \\ \exp\left(j\frac{2\pi}{\lambda} dx \cdot 1 \cdot \sin\theta_d\right) \\ \vdots \\ \exp\left(j\frac{2\pi}{\lambda} dx \cdot (m-1) \cdot \sin\theta_d\right) \end{bmatrix}$$

A direction matrix $A\theta$ for a space matrix is expressed by the following Equation 3.

$$A_\theta = [a(\theta_1), a(\theta_2), \ldots, a(\theta_D)]$$

Then, a steering vector "a" (fd) decoding an incoming direction of a target signal d is expressed by the following Equation 4.

$$a(f_d) = \begin{bmatrix} \exp\left(j2\pi \cdot \frac{0}{T} \cdot f_d\right) \\ \exp\left(j2\pi \cdot \frac{1}{T} \cdot f_d\right) \\ \vdots \\ \exp\left(j2\pi \cdot \frac{(1-1)}{T} \cdot f_d\right) \end{bmatrix}$$

Thereby, a direction matrix Af for time-series is expressed by the following Equation 5.

$$A_f = [a(f_1), a(f_2), \ldots, a(f_D)]$$

Thus, a direction matrix A($\theta$, f) uses a spatiotemporal steering vector "a" expressed by the following Equation 6, $$a(\theta_d, f_d) = \begin{bmatrix} \exp\left(j2\pi \cdot \frac{0}{T} \cdot f_d\right) \cdot a(\theta_d) \\ \exp\left(j2\pi \cdot \frac{1}{T} \cdot f_d\right) \cdot a(\theta_d) \\ \vdots \\ \exp\left(j2\pi \cdot \frac{(1-1)}{T} \cdot f_d\right) \cdot a(\theta_d) \end{bmatrix}$$

and then given by the following Equation 7.

$$A_{\theta,f} = [a(\theta_1, f_1), a(\theta_2, f_2), \ldots, a(\theta_D, f_D)]$$

Here, calculation of a covariance matrix Rk in calculated by using an input vector Xk of (NM×1) dimension at a time k in accordance with the following Equation 8.

$$R_k = \frac{1}{K - k + 1} \sum_{n=k}^{K} x_k \cdot x_k^H$$

For instance, a weight W of a Wiener Filter is calculated by the following Equation 9 by using a steering vector "s" for a $\theta$1 direction.

By applying the calculated weight to a beam combination circuit, a reception beam in which an unnecessary wave is suppressed and combined at a maximum ratio may be formed.

Figure 6:
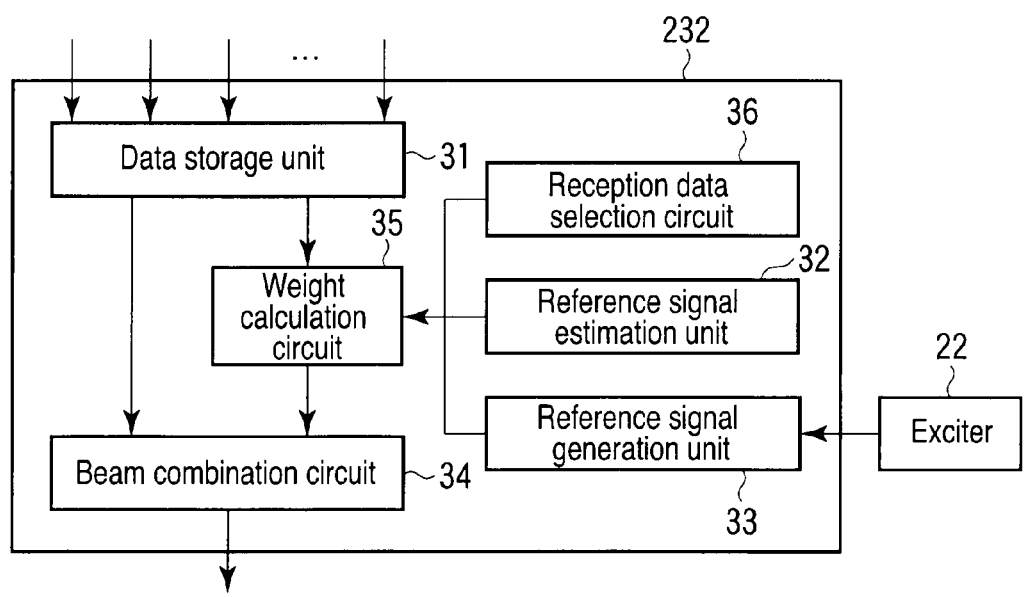
FIG. 6 is an exemplary block diagram depicting a concrete configuration of a distributed aperture combination circuit for use in the radar apparatus.

A concrete configuration of the combination circuit 232 will be shown in FIG. 6, and a supplementary explanation of its processing content will be described.

The reception data obtained by the antenna sub-modules L1-Ln are transmitted to a data storage unit 31. In the storage unit 31, storage areas corresponding to processing range cells of lengths appropriate to the prescribed distances are prepared in advance; input data is stored step by step in the corresponding-storage areas along with reception timing.

Here, a part item of the input data is transmitted to a reference signal estimation unit 32 to be used as a reference of amplitude and phase of the reception signal. The exciter 22 periodically excites the signal estimation unit 32 and a reference signal generation unit 33 to estimate and generate reference signals for calculating weight each of the range cells corresponding to the prescribed distances.

The storage data in the storage unit 31 is transmitted to a beam combination circuit 34 and a weight computation circuit 35. The computation circuit 35 calculates a covariance matrix from data in range cells excluding range cells assumed to include the target signal, namely, from data in cells assumed to be formed solely from unnecessary waves. Finally, the beam combination circuit 34 applies weight control to the antenna reception signal by means of appropriate weight calculated on the basis of the covariance matrix to define the storage data as output data.

In the weight control in spatiotemporal adaptation signal processing system of the foregoing configuration, a weight computation circuit 35 conducts weight computation for each range cell in order to calculate adoptive weight.

Figure 7:
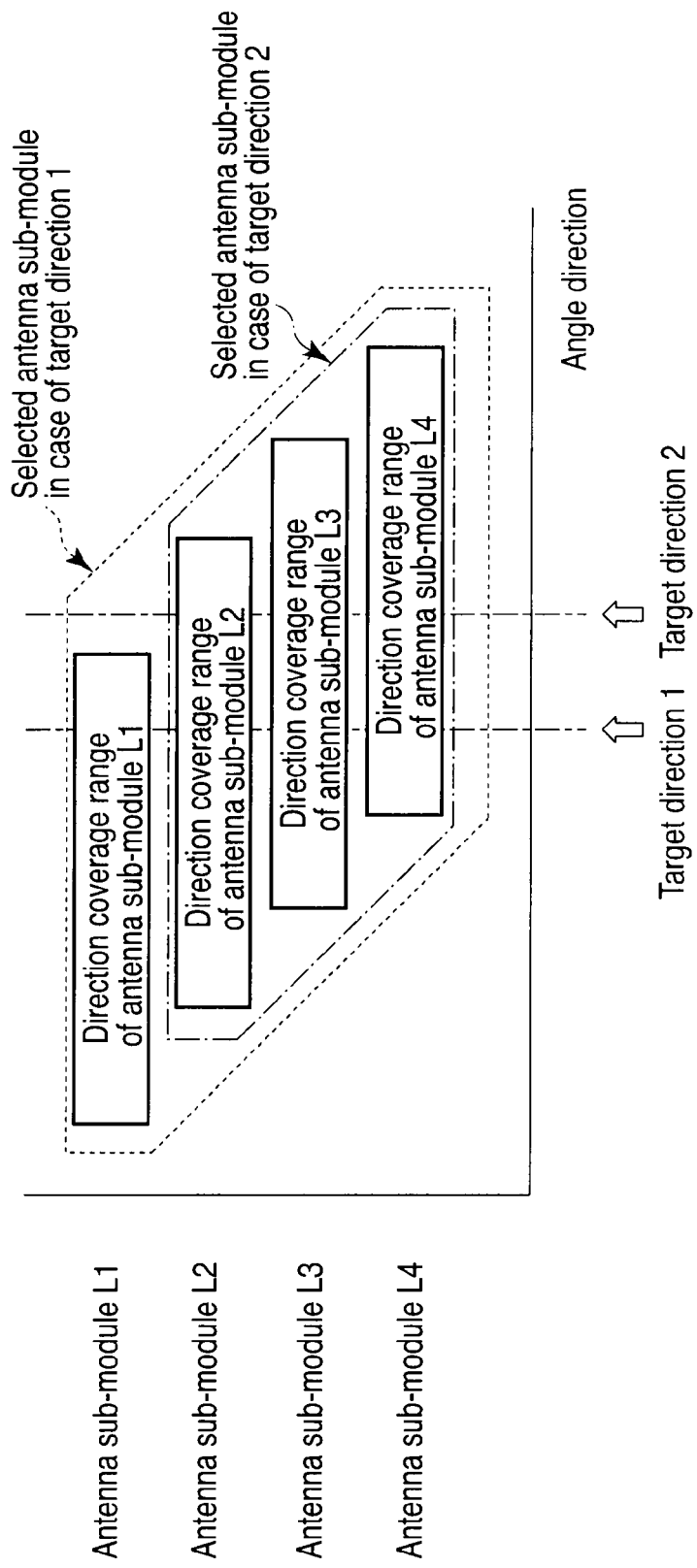
FIG. 7 is an exemplary schematic view depicting an example of a case in which each of direction coverage ranges of the transmission/reception sub-modules are deviated from one another.

Here, since each antenna sub-module L1-Ln is deviated in each direction coverage range, for example, as shown in FIG. 7, by switching over between reception data of sub-modules to be used in a case of a target direction 1 and reception data of sub-modules to be used in a case of a target direction 2, an effective property of the combined beam may be enhanced. Therefore, as shown in FIG. 6, a reception data selection circuit 36 may selectively switch over the reception data of each sub-module L1-Ln in matching with the target direction and transmit the reception data to the weight computation circuit 35.

As described above, in the radar apparatus of the foregoing configuration, a plurality of low-profile and flexible antenna sub-modules L1-Ln are mounted at arbitrary positions of the airplane body. By exciting each antenna sub-module L1-Ln and by individually and selectively applying directional control, the reception beams are formed, and by taking in the reception signal by each antenna sub-module L1-Ln to apply the distributed aperture combination processing, the beam combination signal is obtained.

In this way, the reception signal obtained by each antenna sub-module L1-Ln is stored in matching with the reception timing in the storage areas corresponding to the processing range cells. By taking in the reception signal obtained by any one of the plurality of antenna sub-modules L1-Ln to set it as a reference of the amplitude and phase of the reception signal, the radar apparatus estimates a reference signal to calculate each adaptive weight of the range cells corresponding to the distances.

Meanwhile, the radar apparatus calculates the covariance matrix from the data in the cell assumed to be formed solely from the unnecessary wave excluding the range cells assumed to include the target signal from the foregoing storage data, and applies the weight to the antenna reception signals by means of the adaptive weight of which the weight has been calculated on the basis of the covariance matrix. As a result, even in an airplane which cannot sufficiently secure a mounting space, the reception signal equivalent to that of a single antenna of a large aperture can be obtained.

That is, according to the radar apparatus of the foregoing configuration and its method for forming the reception beam, by making the module active phased array antennas low-profile and flexible to mount the module antennas on arbitrary positions (e.g., each portion of an airplane body if flying object), further, by applying the distributed aperture combination processing to a plurality of module signals, the reception signal equivalent to that of the single antenna of the large aperture may be obtained. By taking such means, the radar apparatus which is high in performance and is equivalent to the active phased array radar of the large aperture can be actualized. According to the invention, even on the existing airplane body of the flying object or on the ground surface of an arbitrary land shape, such a radar can be easily achieved.

Figure 8:
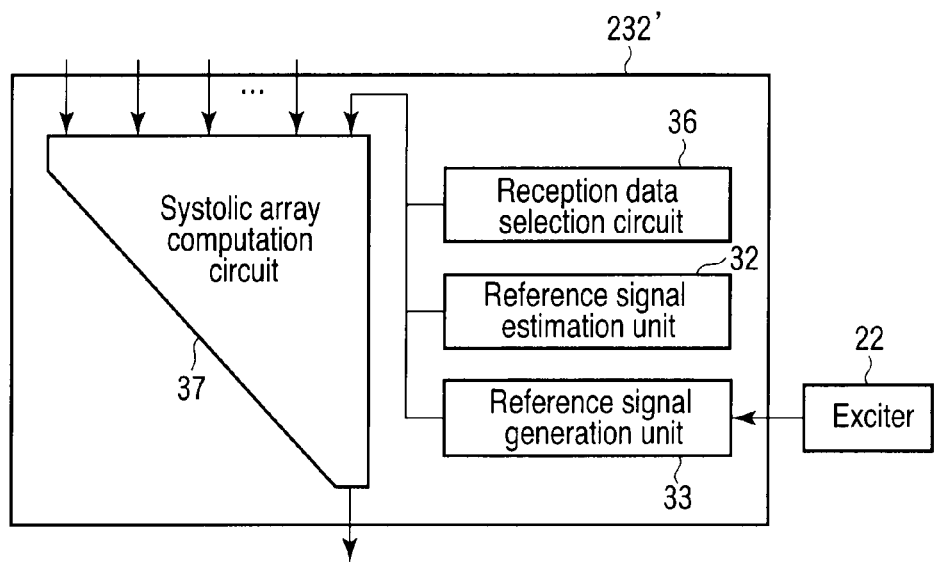
FIG. 8 is an exemplary block diagram depicting another concrete example of the distributed aperture combination circuit.

It is our intention that the invention is not limited to the specific details and representative embodiments shown and described herein, and in an implementation phase, this invention may be embodied in various forms without departing from the spirit or scope of the general inventive concept thereof. For instance, as shown in FIG. 8, as regards a configuration of a distributed aperture combination circuit 232', a systolic array computation circuit 37 provided with the weight computation circuit 35 and the beam combination circuit 34 may be adopted.

Figure 9:
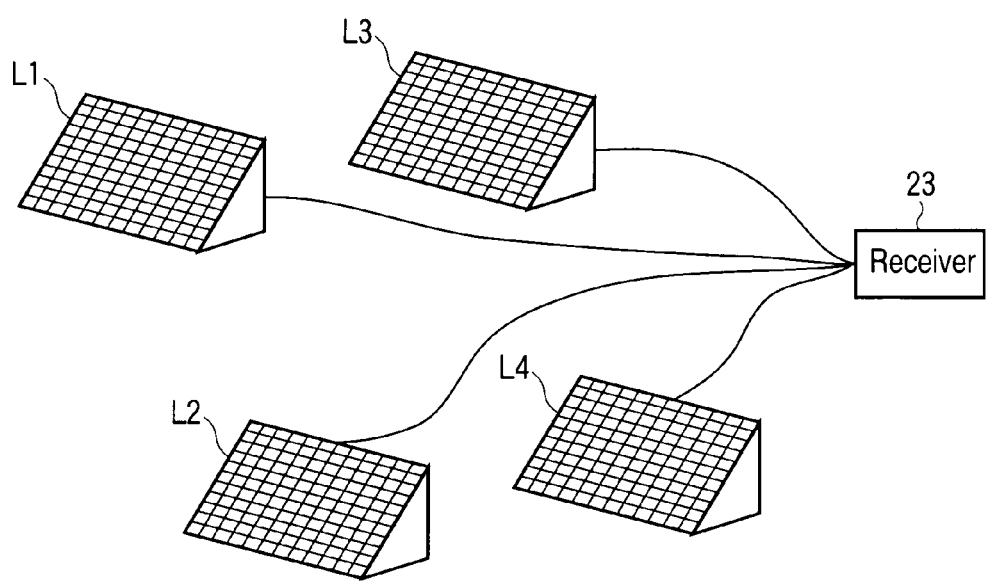
FIG. 9 is an exemplary schematic view depicting an antenna installation image in a case in which the radar apparatus of the invention is placed on the ground surface in an arbitrary shape.

While the foregoing embodiment has been described the case of the mounting on the airplane, the invention is not limited to the embodiment. For instance, in a radar apparatus placed on the ground, each antenna sub-module L1'-Ln' may be arranged at arbitrary places in an appropriate distributed arrangement manner as shown in FIG. 9. That is, exciting individual antenna sub-modules L1'-Ln' to individually and selectively apply directional control forms the reception beam, and taking in the reception signal obtained by each antenna sub-module L1'-Ln' to be applied the distributed aperture combination processing obtains the beam combination signal. In this case, regardless of unevenness of the installation place, the aperture combination may be performed precisely, even at a place where it is hard to install the antenna of the large aperture, the reception signal equivalent to that of the single antenna of the large aperture. It is not necessary for individual antenna sub-module to be installed on the ground surface, it can be similarly implemented that, for example, each antenna sub-module is distributed and attached to an arbitrary building.

Although not shown, the radar apparatus can be similarly implemented by individually mounted on vehicles, and by arranging each vehicle on site to arrange each antenna sub-module in an arbitrary shape.

Other than this, according to the invention, an appropriate combination of a plurality of constituent elements disclosed in the aforementioned embodiments enables forming various inventions. For instance, some constituent elements may be omitted from the whole of the constituent elements shown in the embodiments. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radar apparatus comprising:
 a plurality of antenna sub-modules which are separately arranged from each other at arbitrary positions within a preset range, and that function as individual active phased array antennas, and that also function, as a whole, as a single active phased array antenna;

a control device which forms a reception beam by exciting the plurality of antenna sub-modules and by individually and selectively applying directional control; and a reception processor which obtains a beam combination signal by taking in a reception signal obtained by each of the plurality of antenna sub-modules to apply distributed aperture combination processing to the reception signal.

2. The apparatus according to claim 1, wherein the reception processor comprises:

a storage device which stores the reception signals obtained by the plurality of antenna sub-modules along with reception timing in storage areas corresponding to processing range cells;

a weight calculation device which takes in the reception signal obtained by any one of the plurality of antenna sub-modules, estimates a reference signal as a reference of amplitude and phase of the reception signal, and calculates each appropriate weight corresponding to a distance; and a reception beam combination device which computes a covariance matrix from data of cells assumed to be formed solely from unnecessary waves excluding range cells assumed to include a target signal from the storage device, and combines a reception beam by weighting to an antenna reception signal by means of appropriate weight calculated by the weight calculation device on the basis of the covariance matrix.

3. The apparatus according to claim 1, wherein the control device selects a corresponding-module from each coverage range of the plurality of antenna sub-modules in advance.

4. The radar apparatus according to claim 2, wherein:
the reception beam combination device stores the reception signals obtained by the plurality of antenna sub-modules along with reception timing in storage areas corresponding to processing rages;

estimates a reference signal by defining the reception signal obtained by any one of the plurality of antenna sub-modules as a reference of amplitude and phase to calculate each appropriate weight of range cells corresponding to a distance; and, computes a covariance matrix from data of cells assumed to be formed solely from unnecessary waves excluding range cells assumed to include a target signal from a storage device, and combines a reception beam by weighting to an antenna reception signal by means of appropriate weight calculated by the weight calculation device on the basis of the covariance matrix.

5. The apparatus according to claim 1, wherein the control device selects a corresponding-module from each coverage range of the plurality of the antenna sub-modules in advance, when a target direction is decided.

6. A method for forming a reception beam of a radar apparatus, comprising:

dividing an active phased array antenna that functions, as a whole, as a single active phased array antenna into a plurality of antenna sub-modules that function as individual active phased array antennas, and to install each divided module to be separately arranged from each other at an arbitrary position within a preset range;

forming a reception beam by exciting the plurality of antenna sub-modules to individually and selectively apply direction control; and combining a beam combination signal by taking in a reception signal each obtained by the plurality of antenna sub-modules to apply distributed aperture combination processing.

* * * * *